US006691021B2

(12) United States Patent
Takagi et al.

(10) Patent No.: US 6,691,021 B2
(45) Date of Patent: Feb. 10, 2004

(54) FAILURE DETERMINATION SYSTEM, FAILURE DETERMINATION METHOD AND ENGINE CONTROL UNIT FOR VARIABLE-CYLINDER INTERNAL COMBUSTION ENGINE

(75) Inventors: Jiro Takagi, Saitama-ken (JP); Yasuaki Asaki, Saitama-ken (JP); Mikio Fujiwara, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 175 days.

(21) Appl. No.: 10/046,756

(22) Filed: Jan. 17, 2002

(65) Prior Publication Data

US 2002/0099495 A1 Jul. 25, 2002

(30) Foreign Application Priority Data

Jan. 24, 2001 (JP) ...................................... 2001-015775

(51) Int. Cl.[7] ................................................ B60T 7/12
(52) U.S. Cl. .......................... 701/109; 123/690; 60/274
(58) Field of Search ................................ 701/107, 108, 701/109, 110, 112, 113, 114; 60/274, 285, 276, 278, 295; 123/690

(56) References Cited

U.S. PATENT DOCUMENTS 4,895,118 A * 1/1990 Nakamura ............. 123/339.22
5,036,470 A * 7/1991 Suzuki et al. ............... 701/109
5,694,901 A * 12/1997 Togai et al. ................ 123/436
5,715,779 A * 2/1998 Kato et al. ............... 123/90.15
5,948,974 A * 9/1999 Mitsutani ................... 73/118.1
6,073,610 A * 6/2000 Matsumoto et al. ........ 123/396

* cited by examiner

*Primary Examiner*—John Kwon
(74) *Attorney, Agent, or Firm*—Arent Fox Kintner Plotkin & Kahn

(57) ABSTRACT

There is provided a failure determination system for a variable-cylinder internal combustion engine which is capable of promptly and accurately carrying out failure determination of the valve-actuating system for cylinders for being made idle during a partial-cylinder operation mode. The failure determination system is capable of switching a cylinder operation mode between an all-cylinder operation mode in which all the cylinders are operated, and a partial-cylinder operation mode in which part of the cylinders are made idle. The failure determination system includes an ECU which executes a failure-determining operation mode for causing a valve-actuating mechanism to resume actuation of intake valves and exhaust valves of the part of the cylinders in a state in which fuel supply to the part of the cylinders is stopped, when the cylinder operation mode is shifted from the partial-cylinder operation mode to the all-cylinder operation mode. The ECU determines whether or not the valve-actuating system including the valve-actuating mechanism has failed, based on an oxygen concentration detected when the failure-determining operation mode is executed.

12 Claims, 3 Drawing Sheets

FAILURE DETERMINATION SYSTEM, FAILURE DETERMINATION METHOD AND ENGINE CONTROL UNIT FOR VARIABLE-CYLINDER INTERNAL COMBUSTION ENGINE

BACKGROUND OF THE INVENTION

1. Field of the Invention

This invention relates to a failure determination system, a failure determination method, and an engine control unit for a variable-cylinder internal combustion engine which is capable of switching a cylinder operation mode between an all-cylinder operation mode in which all of a plurality of cylinders are operated and a partial-cylinder operation mode in which part of the plurality of cylinders are made idle, the failure determination system being capable of determining whether or not the valve-actuating system associated with the part of the plurality of cylinders for being made idle has failed.

2. Description of the Prior Art

A failure determination system of this kind has been proposed e.g. by Japanese Laid-Open Patent Publication (Kokai) No. 7-63097. In the variable-cylinder internal combustion engine disclosed in this publication, all the four cylinders of the engine are operated during the all-cylinder operation mode, whereas two of the four cylinders are made idle, i.e. inhibited from operating, during the partial-cylinder operation mode. In the exhaust system of the variable-cylinder engine, an oxygen concentration sensor is arranged for detecting the concentration of oxygen in exhaust gases. The oxygen concentration sensor delivers a signal indicative of the sensed oxygen concentration, based on which is calculated an actual air-fuel ratio. In the failure determination system, during the all-cylinder operation mode, the count of a failure counter is incremented if the ratio of the actual air-fuel ratio to a reference air-fuel ratio becomes equal to or smaller than a predetermined reference value, that is, if the actual air-fuel ratio is considerably richer than the reference air-fuel ratio. Then, if the count of the failure counter becomes equal to or larger than a predetermined value, it is determined that the valve-actuating system associated with the cylinders for being made idle has failed. This method of failure determination is based on a phenomenon that when the intake valves and exhaust valves of the cylinders for being made idle are in a normally closed state due to the failure of the valve-actuating system associated therewith, the air-fuel ratio of a mixture supplied to the other two cylinders is controlled to a richer value than when the valve-actuating system is normally operating, so that the actual air-fuel ratio undergoes a shift to the richer side.

In the above conventional failure determination system, however, all the cylinders are allowed to operate normally in the all-cylinder operation mode. In this state, it is determined that the valve-actuating system associated with the cylinders for being made idle has failed if the actual air-fuel ratio is shifted to a richer value indicative of failure of the valve-actuating system, since the air-fuel ratio of a mixture supplied to the other cylinders is controlled to a richer value due to the failure of the valve-actuating system of the cylinders for being made idle. Therefore, it takes much time to determine that the valve-actuating system has failed, after the failure has actually occurred. Further, under conditions in which the air-fuel ratio tends to be lean, e.g. when the engine temperature is low or fuel is difficult to vaporize depending on the type thereof, there can be a case where the actual air-fuel ratio is drifted to a leaner value to fall short of the above-mentioned richer value indicative of failure of the valve-actuating system, even though the valve-actuating system has actually failed. In such a case, there occurs an erroneous determination that the valve-actuating system is normally operating although it has failed.

SUMMARY OF THE INVENTION

It is an object of the invention to provide a failure determination system for a variable-cylinder internal combustion engine, which is capable of promptly and accurately carrying out failure determination of the valve-actuating system of cylinders for being made idle during the partial-cylinder operation mode.

To attain the above object, the invention provides a failure determination system for a variable-cylinder internal combustion engine including a plurality of cylinders each having at least one intake valve and at least one exhaust valve, and a valve-actuating system including a valve-actuating mechanism for actuating the at least one intake valve and the at least one exhaust valve of each of the cylinders, the engine being capable of switching a cylinder operation mode between an all-cylinder operation mode in which all of the plurality of cylinders are operated, and a partial-cylinder operation mode in which fuel supply to part of the plurality of cylinders is stopped and at the same time the part of the plurality of cylinders are made idle by stopping the valve-actuating mechanism from actuating the at least one intake valve and the at least one exhaust valve of each of the part of the cylinders.

The failure determination system is characterized by comprising:

- oxygen concentration-detecting means for detecting a concentration of oxygen in exhaust gases exhausted from the plurality of cylinders;
- failure-determining operation mode-executing means for executing a failure-determining operation mode for causing the valve-actuating mechanism to resume actuation of the at least one intake valve and the at least one exhaust valve of at least one of the part of the cylinders in a state in which the fuel supply to the part of the cylinders is stopped, when the cylinder operation mode is switched from the partial-cylinder operation mode to the all-cylinder operation mode; and
- failure determination means for determining whether or not the valve-actuating system including the valve-actuating mechanism has failed, based on an oxygen concentration detected by the oxygen concentration-detecting means when the failure-determining operation mode is executed.

In this variable-cylinder internal combustion engine incorporating the failure determination system according to the first aspect of the invention, the cylinder operation mode is switched between the all-cylinder operation mode and the partial-cylinder operation mode. In the partial-cylinder operation mode, fuel supply to part of the plurality of cylinders by a fuel supply mechanism is stopped, and at the same time the valve-actuating mechanism associated with the part of the cylinders is stopped from actuating the intake valves and exhaust valves of the part of the cylinders, to thereby make the part of the cylinders idle in operation. According to the failure determination system, the failure-determining operation mode is executed by the failure-determining operation mode-executing means when the cylinder operation mode is switched from the partial-cylinder operation mode to the all-cylinder operation mode. In the failure-determining operation mode, the actuation of the intake valves and exhaust valves of at least one of the part of the cylinders is resumed in a state in which fuel supply to the part of the cylinders is stopped. Therefore, when the valve-actuating system associated with the part of the cylinders is normally operating, air taken into combustion chambers from the intake system via the intake valves is directly exhausted to the exhaust system of the engine via the exhaust valves, and hence an oxygen concentration detected at this time by the oxygen concentration-detecting means becomes higher than that detected before the start of the failure-determining operation mode.

On the other hand, when the valve-actuating system of the part of the cylinders has failed, the intake valves and exhaust valves thereof remain held in a closed state to inhibit air from being exhausted to the exhaust system, whereby the concentration of oxygen in exhaust gases is hardly changed in comparison with that before execution of the failure-determining operation mode. As described above, by execution of the failure-determining operation mode, if the valve-actuating system is normally operating, a state is forcibly produced in which the concentration of oxygen in exhaust gases should be made by far higher than before the execution of the failure determination operation mode, and based on the oxygen concentration detected at this time, determination as to whether or not the valve-actuating system has failed is carried out. This makes it possible to carry out the failure determination of the valve-actuating system more promptly and accurately than the conventional system. It should be noted that in the present specification and claims appended thereto, the term "valve-actuating system" is intended to encompass not only the valve-actuating mechanism and a drive source thereof but also intake valves and exhaust valves.

Preferably, the failure determination means determines that the valve-actuating system has failed, when the oxygen concentration is equal to or lower than a predetermined value.

When the failure-determining operation mode is carried out, if the valve-actuating system of the intake and exhaust valves associated with the part of the cylinders, which are caused to resume their operations, is normally operating, the concentration of oxygen in exhaust gases changes in an increasing direction. Therefore, according to this preferred embodiment, it is possible to properly determine whether or not the valve-actuating system has failed, by comparing a detected oxygen concentration with the predetermined value.

Preferably, the failure determination means determines that the valve-actuating system has failed, when an amount of change in the oxygen concentration in an increasing direction is smaller than a predetermined amount of change.

Under conditions in which the concentration of oxygen in exhaust gases is liable to be high, e.g. when the engine temperature is low, the concentration of oxygen in exhaust gases before execution of the failure-determining operation mode tends to have been drifted to a relatively high value. Even under such a condition liable to the drift, according to the preferred embodiment, the determination as to whether or not the valve-actuating systems have failed is carried out based on the amount of change in the oxygen concentration in the increasing direction, and hence it is possible to prevent erroneous determination of the failure of the valve-actuating system, whereby the accuracy of the failure determination can be further enhanced.

To attain the above object, according to a second aspect of the invention, there is provided a failure determination system for a variable-cylinder internal combustion engine including a plurality of cylinders each having at least one intake valve and at least one exhaust valve, and a valve-actuating system including a valve-actuating mechanism for actuating the at least one intake valve and the at least one exhaust valve of each of the cylinders, the engine being capable of switching a cylinder operation mode between an all-cylinder operation mode in which all of the plurality of cylinders are operated, and a partial-cylinder operation mode in which fuel supply to part of the plurality of cylinders is stopped and at the same time the part of the plurality of cylinders are made idle by stopping the valve-actuating mechanism from actuating the at least one intake valve and the at least one exhaust valve of each of the part of the cylinders.

The failure determination system according to the second aspect of the invention is characterized by comprising:

- an oxygen concentration-detecting module for detecting a concentration of oxygen in exhaust gases exhausted from the plurality of cylinders;
- a failure-determining operation mode-executing module for executing a failure-determining operation mode for causing the valve-actuating mechanism to resume actuation of the at least one intake valve and the at least one exhaust valve of at least one of the part of the cylinders in a state in which the fuel supply to the part of the cylinders is stopped, when the cylinder operation mode is switched from the partial-cylinder operation mode to the all-cylinder operation mode; and
- a failure determination module for determining whether or not the valve-actuating system including the valve-actuating mechanism has failed, based on an oxygen concentration detected by the oxygen concentration-detecting module when the failure-determining operation mode is executed.

According to the second aspect of the invention, the same advantageous effects as provided by the first aspect of the invention can be obtained.

Preferably, the failure determination module determines that the valve-actuating system has failed, when the oxygen concentration is equal to or lower than a predetermined value.

According to this preferred embodiment, the same advantageous effects as provided by the corresponding preferred embodiment of the first aspect of the invention can be obtained.

Preferably, the failure determination module determines that the valve-actuating system has failed, when an amount of change in the oxygen concentration in an increasing direction is smaller than a predetermined amount of change.

According to this preferred embodiment, the same advantageous effects as provided by the corresponding preferred embodiment of the first aspect of the invention can be obtained.

To attain the above object, according to a third aspect of the invention, there is provided a method of determining failure of a valve-actuating system of a variable-cylinder internal combustion engine including a plurality of cylinders each having at least one intake valve and at least one exhaust valve, and the valve-actuating system including a valve-actuating mechanism for actuating the at least one intake valve and the at least one exhaust valve of each of the cylinders, the engine being capable of switching a cylinder operation mode between an all-cylinder operation mode in which all of the plurality of cylinders are operated, and a partial-cylinder operation mode in which fuel supply to part of the plurality of cylinders is stopped and at the same time the part of the plurality of cylinders are made idle by stopping the valve-actuating mechanism from actuating the at least one intake valve and the at least one exhaust valve of each of the part of the cylinders.

The method according to the third aspect of the invention is characterized by comprising the steps of:

detecting a concentration of oxygen in exhaust gases exhausted from the plurality of cylinders;

executing a failure-determining operation mode for causing the valve-actuating mechanism to resume actuation of the at least one intake valve and the at least one exhaust valve of at least one of the part of the cylinders in a state in which the fuel supply to the part of the cylinders is stopped, when the cylinder operation mode is switched from the partial-cylinder operation mode to the all-cylinder operation mode; and determining whether or not the valve-actuating system including the valve-actuating mechanism has failed, based on an oxygen concentration detected when the failure-determining operation mode is executed.

According to the third aspect of the invention, the same advantageous effects as provided by the first aspect of the invention can be obtained.

Preferably, the determining step includes determining that the valve-actuating system has failed, when the oxygen concentration is equal to or lower than a predetermined value.

According to this preferred embodiment, the same advantageous effects as provided by the corresponding preferred embodiment of the first aspect of the invention can be obtained.

Preferably, the determining step includes determining that the valve-actuating system has failed, when an amount of change in the oxygen concentration in an increasing direction is smaller than a predetermined amount of change.

According to this preferred embodiment, the same advantageous effects as provided by the corresponding preferred embodiment of the first aspect of the invention can be obtained.

To attain the above object, according to a fourth aspect of the invention, there is provided an engine control unit including a control program for causing a computer to carry out determination of failure of a valve-actuating system of a variable-cylinder internal combustion engine including a plurality of cylinders each having at least one intake valve and at least one exhaust valve, and the valve-actuating system including a valve-actuating mechanism for actuating the at least one intake valve and the at least one exhaust valve of each of the cylinders, the engine being capable of switching a cylinder operation mode between an all-cylinder operation mode in which all of the plurality of cylinders are operated, and a partial-cylinder operation mode in which fuel supply to part of the plurality of cylinders is stopped and at the same time the part of the plurality of cylinders are made idle by stopping the valve-actuating mechanism from actuating the at least one intake valve and the at least one exhaust valve of each of the part of the cylinders.

The engine control unit according to the fourth aspect of the invention is characterized in that the control program causes the computer to detect a concentration of oxygen in exhaust gases exhausted from the plurality of cylinders, execute a failure-determining operation mode for causing the valve-actuating mechanism to resume actuation of the at least one intake valve and the at least one exhaust valve of at least one of the part of the cylinders in a state in which the fuel supply to the part of the cylinders is stopped, when the cylinder operation mode is switched from the partial-cylinder operation mode to the all-cylinder operation mode, and determine whether or not the valve-actuating system including the valve-actuating mechanism has failed, based on an oxygen concentration detected when the failure-determining operation mode is executed.

According to the fourth aspect of the invention, the same advantageous effects as provided by the first aspect of the invention can be obtained.

Preferably, the control program causes the computer to determine that the valve-actuating system has failed, when the oxygen concentration is equal to or lower than a predetermined value.

According to this preferred embodiment, the same advantageous effects as provided by the corresponding preferred embodiment of the first aspect of the invention can be obtained.

Preferably, the control program causes the computer to determine that the valve-actuating system has failed, when an amount of change in the oxygen concentration in an increasing direction is smaller than a predetermined amount of change.

According to this preferred embodiment, the same advantageous effects as provided by the corresponding preferred embodiment of the first aspect of the invention can be obtained.

The above and other objects, features, and advantages of the invention will become more apparent from the following detailed description taken in conjunction with the accompanying drawings.

DETAILED DESCRIPTION OF A PREFERRED EMBODIMENT

Figure 1:
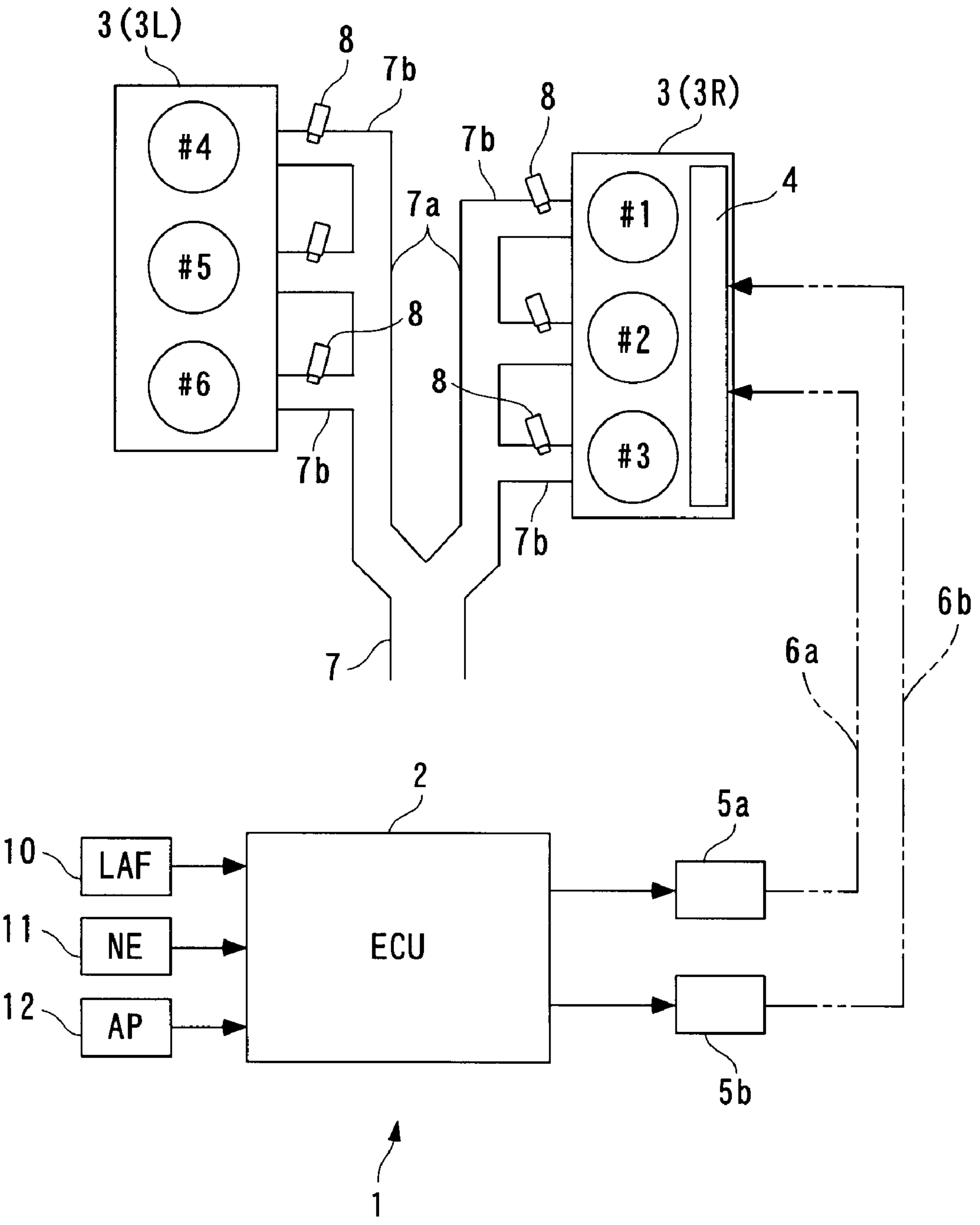
FIG. 1 is a block diagram schematically showing the arrangement of a variable-cylinder internal combustion engine incorporating a failure determination system therefor according to an embodiment of the invention.

The invention will now be described in detail with reference to the drawings showing a preferred embodiment thereof. Referring first to FIG. 1, there is schematically shown the arrangement of a variable-cylinder internal combustion engine 3 (hereinafter simply referred to as "the engine 3") to which is applied a failure determination system 1 according to the preferred embodiment of the present invention.

Referring to the figure, the engine 3 is a V type six-cylinder DOHC gasoline engine, and includes a right bank 3R of three cylinders #1, #2, #3, and a left bank 3L of three cylinders #4, #5, #6. Further, the right bank 3R is provided with a valve-actuating mechanism 4 for carrying out a partial-cylinder operation mode, referred to hereinafter.

The valve-actuating mechanism 4 is connected to a hydraulic pump, not shown, via oil passages 6*a*, 6*b*. Arranged between the hydraulic pump and the valve-actuating mechanism 4 are solenoid valves 5*a*, 5*b* for intake valves and exhaust valves. The solenoid valves 5*a*, 5*b* are both of a normally-closed type and electrically connected to an ECU 2, referred to hereinafter, and open the oil passages 6*a*, 6*b*, respectively, when they are turned on by drive signals delivered from the ECU 2. When the engine 3 is in the partial-cylinder operation mode, the solenoid valves 5*a*, 5*b* are both turned on to open the oil passages 6*a*, 6*b*, whereby hydraulic pressure from the hydraulic pump is supplied to the valve-actuating mechanism 4. This disconnects the intake valves from the respective intake cams, and the exhaust valves from the respective exhaust cams, none of which are shown, of the right bank 3R of the cylinders #1 to #3, thereby holding these intake valves and exhaust valves in a disabled state (closed state).

On the other hand, when the engine 3 is in an all-cylinder operation mode, inversely to the above, the solenoid valves 5*a*, 5*b* are both turned off to close the oil passages 6*a*, 6*b*, whereby supply of the hydraulic pressure from the hydraulic pump to the valve-actuating mechanism 4 is stopped. This recovers the intake valves and cams and the exhaust valves and cams of the cylinders #1 to #3 of the right bank 3R from the state disconnected from each other, whereby the intake valves and the exhaust valves are made movable. More specifically, the valve-actuating mechanism 4 as described above is configured similarly to a valve-actuating mechanism proposed e.g. by Japanese Patent Application No. 11-268145 incorporated herein by reference.

Connected to the six cylinders #1 to #6 is an intake pipe 7 via an intake manifold 7*a*. The intake manifold 7*a* has branch portions 7*b* having injectors 8 inserted therein such that the injectors 8 face respective intake ports, not shown, of the cylinders. The injectors 8 inject fuel into the respective branch portions 7*b* in response to drive signals from the ECU 2 during the all-cylinder operation mode in which all the cylinders are driven. On the other hand, during the partial-cylinder operation mode, the injectors 8 are controlled such that fuel injection by the three injectors 8 for the right bank 3R is stopped.

As described above, during the partial-cylinder operation mode, the cylinders #1 to #3 of the right bank 3R are made idle by the disabled state of the intake valves and the exhaust valves and interruption of fuel injection by the injectors 8, whereas during the all-cylinder operation mode, all the six cylinders #1 to #6 are operated in the order of #1→#5→#3→#6→#2→#4.

The ECU 2 has a LAF sensor 10 (oxygen concentration-detecting means), an engine rotational speed sensor 11, and an accelerator pedal opening sensor 12 connected thereto. The LAF sensor 10 is arranged at a location upstream of a catalytic device, not shown, in an exhaust pipe, not shown. The LAF sensor 10 is comprised of zirconia and platinum electrodes, and linearly detects the concentration of oxygen in exhaust gases in a broad air-fuel ratio range from a rich region to a lean region, to deliver a signal proportional to the sensed concentration of oxygen to the ECU 2. As will be described in detail hereinafter, the ECU 2 executes failure determination of a valve-actuating system for the right bank R, based on the oxygen concentration VLAF detected by the LAF sensor 10.

The respective engine rotational speed sensor 11 and accelerator pedal opening sensor 12 detect an engine rotational speed NE and an operation amount or stepping amount AP (hereinafter referred to as "the accelerator pedal opening AP") of an accelerator pedal, not shown, for an automotive vehicle, not shown, on which the engine 3 is installed, and deliver a signal indicative of the sensed engine rotational speed and a signal indicative of the sensed accelerator pedal opening AP to the ECU 2.

The ECU 2 (failure-determining operation mode-executing means, failure determination means) is formed by a microcomputer including an I/O interface, a CPU, a RAM, and a ROM, none of which are specifically shown. The signals from the sensors 10 to 12 are input into the CPU via the I/O interface. The CPU carries out air-fuel ratio control based on the above signals, according to control programs read from the ROM and data read from the RAM, such that the air-fuel ratio of an air-fuel mixture becomes equal to a target air-fuel ratio. Further, the CPU switches the cylinder operation mode of the engine 3 between the all-cylinder operation mode and the partial-cylinder operation mode, and carries out a failure-determining operation mode when the cylinder operation mode is switched from the partial-cylinder operation mode to the all-cylinder operation mode, thereby executing failure determination of the valve-actuating system including the valve-actuating mechanism 4 for the right bank 3R.

Figure 2:
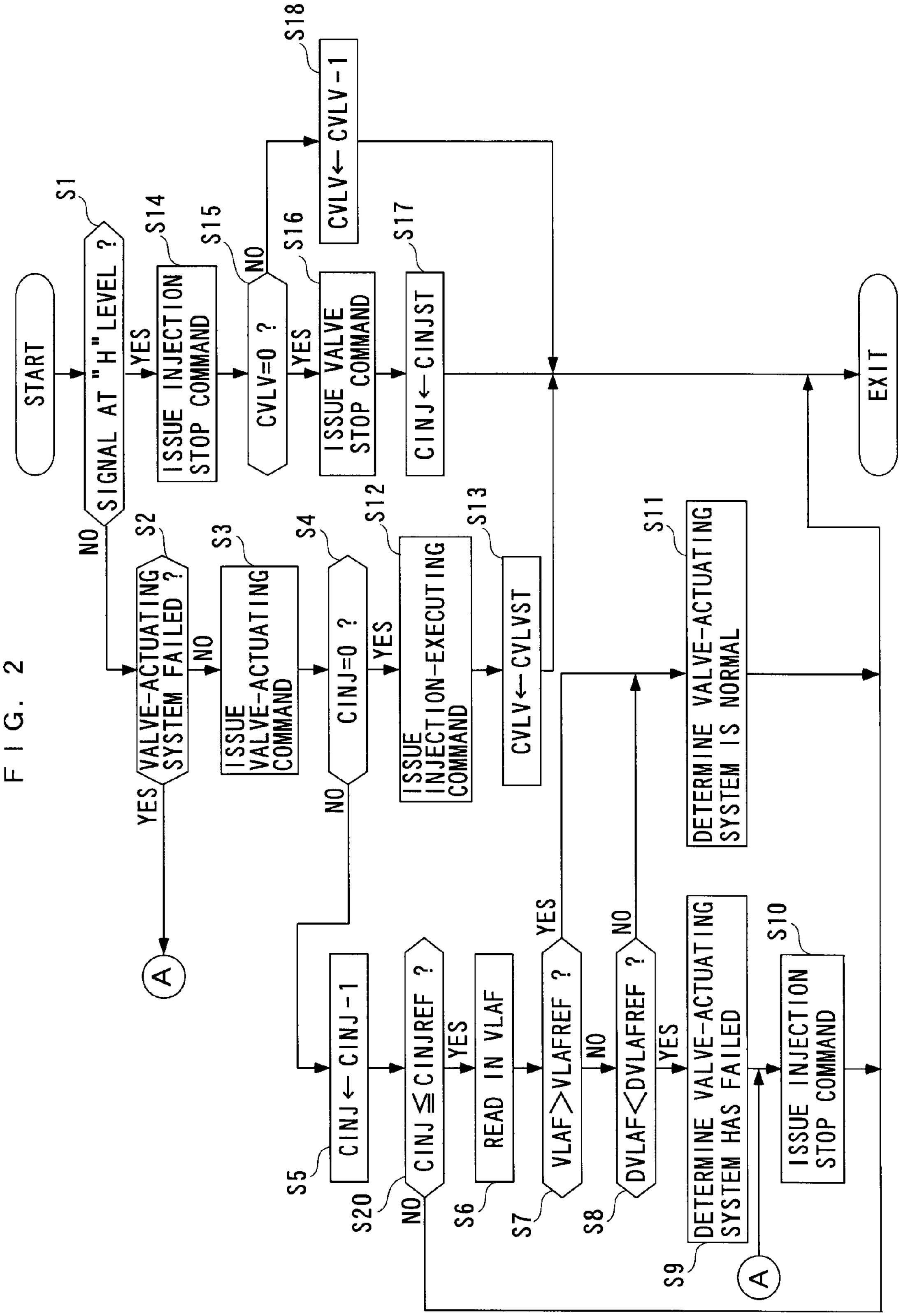
FIG. 2 is a flowchart showing an example of a control process for carrying out failure determination.

Next, a control process for carrying out the above failure determination carried out by the ECU 2 will be described with reference to FIG. 2. This process is executed in synchronism with generation of each TDC signal pulse (in TDC timing of each cylinder).

As shown in the figure, first, in a step S1, it is determined whether or not a cylinder stop command signal (see FIG. 3) is at "H" level. The cylinder stop command signal is set to "H" level when a cylinder stop condition is satisfied, whereas when the cylinder stop condition is not satisfied, the cylinder stop command signal is set to "L" level. In the present embodiment, the cylinder stop condition is that the engine rotational speed NE is within a predetermined range (e.g. 1000 to 3500 rpm) or that the accelerator pedal opening AP is smaller than a table value which is set in advance according to the engine rotational speed NE.

If the answer to the question of the step S1 is negative (NO), i.e. if the cylinder stop condition is not satisfied, the program proceeds to a step S2, wherein it is determined whether or not it has been determined that the valve-actuating system for the cylinders #1 to #3 has failed. This determination is carried out based on the value of a failure determination flag set at steps S9, S11, referred to hereinafter. If the answer to this question is affirmative (YES), i.e. if it has already been determined that the valve-actuating system has failed, the program proceeds to a step S10, wherein an injection stop command is issued so as to stop fuel injection by the injectors 8 for the cylinders #1 to #3 of the right bank R, followed by terminating the present program. Thus, the fuel injection into the cylinders #1 to #3 by the injectors 8 is stopped.

On the other hand, if the answer to the question of the step S2 is negative (NO), i.e. if it has not been determined that the valve-actuating system has failed, the program proceeds to a step S3, wherein valve-actuating commands are issued to allow the intake valves and exhaust valves of the cylinders #1 to #3 to operate. This causes the intake valves and exhaust valves for the respective cylinders #1 to #3 to be actuated by the valve-actuating mechanism 4.

Next, the program proceeds to a step S4, wherein it is determined whether or not the count CINJ of a delay counter is equal to 0. The delay counter is used for measuring a time period elapsed after the cylinder operation mode was switched from the partial-cylinder operation mode to the all-cylinder operation mode. If the answer to this question is negative (NO), i.e. if $CINJ \neq 0$, the program proceeds to a step S5, wherein the count CINJ is decremented by 1.

Then, the program proceeds to a step S20, wherein the count CINJ of the delay counter is equal to or smaller than a predetermined value CINJREF. If the answer to this question is negative (NO), the present program is terminated, whereas if the answer to the question is affirmative (YES), i.e. if a predetermined time period has elapsed after the cylinder operation mode was switched to the all-cylinder operation mode, the program proceeds to a step S6, wherein the oxygen concentration VLAF detected by the LAF sensor 10 is read in.

Then, the program proceeds to a step S7, wherein it is determined whether or not the oxygen concentration VLAF read in in the step S6 is higher than a predetermined value VLAFREF. If the answer to this question is negative (NO), the program proceeds to a step S8, wherein it is determined whether or not the difference (amount of change) DVLAF (=VLAF−VLAFT) between the present value VLAF and the immediately preceding value VLAFT of the oxygen concentration is smaller than a predetermined value DVLAFREF (predetermined amount of change).

If the answer to this question is affirmative (YES), i.e. if VLAF≦VLAFREF holds, and at the same time DVLAF<DVLAFREF holds, it is judged that in spite of the fact that the intake valves and exhaust valves were operated without carrying out fuel injection, and hence the concentration of oxygen in exhaust gases should have been made high and/or the amount of the change in the oxygen concentration should have been large, none of these results have been obtained, so that the program proceeds to a step S9, wherein it is determined that the valve-actuating system for the cylinders #1 to #3 has failed, and the value of the failure determination flag is set to 1 so as to indicate that the valve-actuating system has failed.

On the other hand, if the answer to the question of the step S7 is affirmative (YES), or if the answer to the question of the step S8 is negative (NO), i.e. if VLAF>VLAFREF or DVLAF≧DVLAFREF holds, the program proceeds to a step S11, wherein it is determined that the valve-actuating system is normally operating, and the value of the failure determination flag is set to 0 so as to indicate the normal state of the valve-actuating system, followed by terminating the present program.

If the answer to the question of the step S4 is affirmative (YES), i.e. if the count CINJ is equal to 0, and hence the predetermined time period has elapsed after the cylinder operation mode was switched to the all-cylinder operation mode, the program proceeds to a step S12, wherein an injection executing command is issued in order to cause fuel injection by the injectors 8. Then, the program proceeds to a step S13, wherein the count CVLV of a valve stop delay counter is set to a predetermined value CVLVST, followed by terminating the present program. The valve stop delay counter is used for measuring a delay time during which the disabling of the intake valves and exhaust valves is delayed so as to reliably discharge exhaust gases from the combustion chambers of the cylinders #1 to #3 whose operations are to be stopped, i.e. made idle, when the cylinder operation mode has been switched from the all-cylinder operation mode to the partial-cylinder operation mode.

If the answer to the question of the step S1 is affirmative (YES), i.e. if the cylinder stop command signal is at "H" level since the cylinder stop condition is satisfied, the program proceeds to a step S14, wherein the injection stop command is issued, similarly to the step S10.

Then, the program proceeds to a step S15, wherein it is determined whether or not the count CVLV of the valve stop delay counter is equal to 0. If the answer to this is negative (NO), i.e. if CVLV≠0, the program proceeds to a step S18, wherein the count CVLV is decremented by 1, followed by terminating the present program. On the other hand, if the answer to the question of the step S15 is affirmative (YES), i.e. if CVLV=0 holds, which means that a predetermined time period has elapsed after the all-cylinder operation mode was switched to the partial-cylinder operation mode, the program proceeds to a step S16, wherein valve stop commands are issued to disable the intake valves and exhaust valves of the cylinders #1 to #3. Thus, the valve-actuating mechanism 4 is stopped from actuating the intake valves and exhaust valves of the cylinders #1 to #3.

Next, the program proceeds to a step S17, wherein the count CINJ of the delay counter is set to a predetermined value CINJST, followed by terminating the present program.

Figure 3:
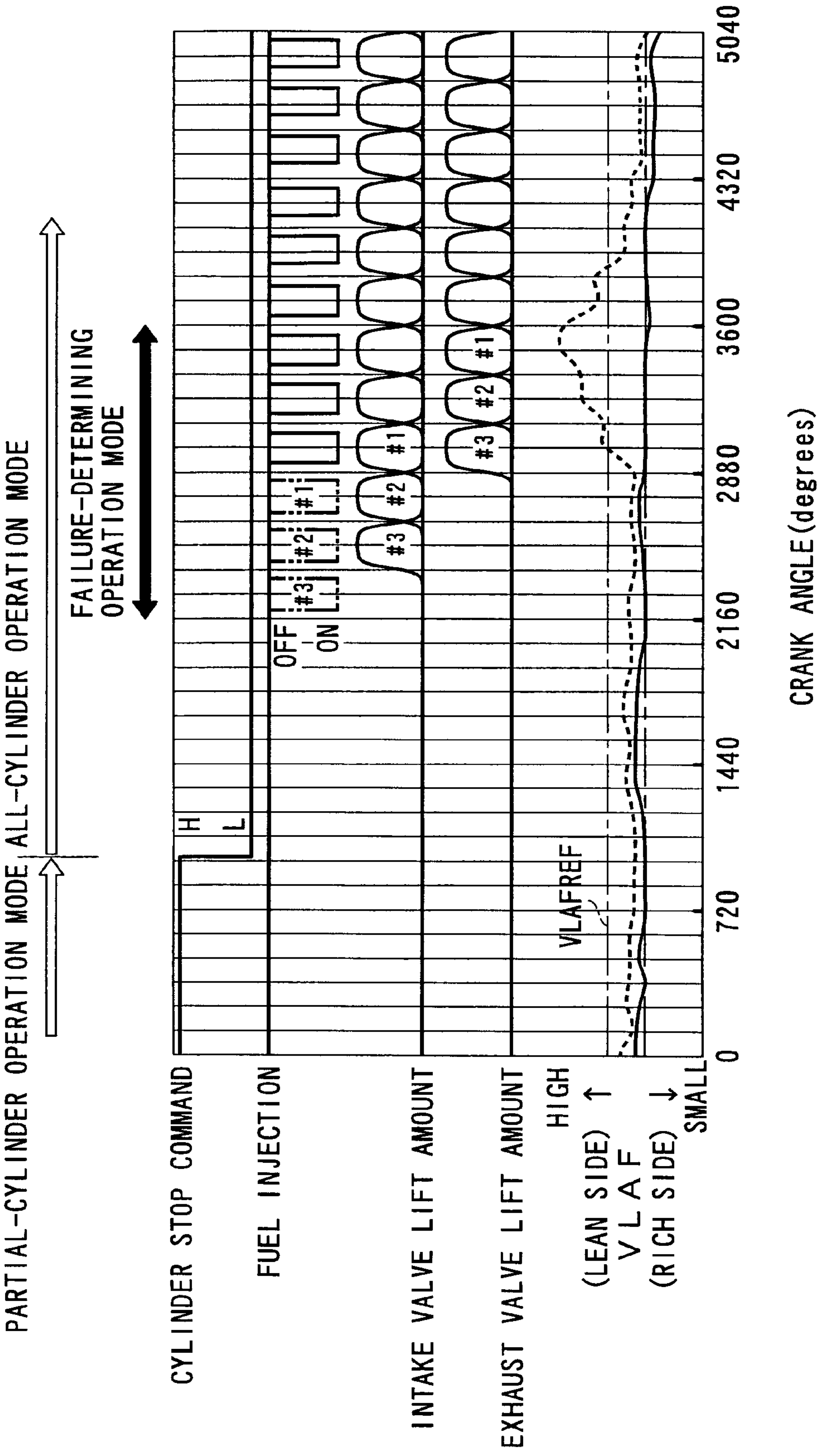
FIG. 3 is a timing chart showing an example of changes in results of the control obtained when the FIG. 2 control process is executed.

FIG. 3 shows an example of results of the control obtained by executing the above control process. In the figure, the oxygen concentration VLAF detected by the LAF sensor 10 when the valve-actuating system for the cylinders #1 to #3 is normally operating is shown by a broken line whereas the oxygen concentration VLAF detected when the valve-actuating system has failed is shown by a solid line. It should be noted that in the above control process, normal air-fuel ratio control is carried out for the cylinders #4 to #6, not shown.

First, during the partial-cylinder operation mode, when the cylinder stop condition ceases to be fulfilled, the level of the cylinder stop command signal is changed from "H" level to "L" level, so that the partial-cylinder operation mode is terminated to be switched to the all-cylinder operation mode. After a time period during which the crankshaft of the engine 3 rotates through certain crank angles has elapsed since the switching of the partial-cylinder operation mode to the all-cylinder operation mode, the failure-determining operation mode is executed for each of the cylinders #1 to #3 during one combustion cycle (during a time period over which the crankshaft rotates through 720 degrees). More specifically, the intake valve of the cylinder #3 is opened and closed in a state in which fuel injection into the cylinder #3 is not carried out (state indicated by two-dot chain lines in the figure), and then the exhaust valve of the cylinder #3 is opened and closed with some delay. Similarly, the intake valves and exhaust valve of the cylinders #2, #1 are opened and closed in the order of the cylinder #2→the cylinder #1 in a state in which fuel injection into the cylinders is not carried out.

In accordance with the above opening and closing operations of the intake valves and exhaust valves, if the valve-actuating system of each of the cylinders #1 to #3 is normally operating, the oxygen concentration VLAF starts to be increased from a time point immediately after opening the exhaust valve of the cylinder #3, by a greater degree than before opening the exhaust valve. Consequently, the oxygen concentration VLAF becomes higher than the predetermined value VLAFREF, or the difference DVLAF in the oxygen concentration becomes equal to or higher than the predetermined value DVLAFLEF, whereby it is judged that the valve-actuating system is normally operating.

On the other hand, if the valve-actuating system for the cylinders #1 to #3 has failed, the intake valves and exhaust valves of the cylinders remain held in a closed state although the failure-determining operation mode is executed. As a result, as shown by the solid line in FIG. 3, the oxygen concentration VLAF undergoes hardly any change, so that the oxygen concentration VLAF cannot reach the predetermined value VLAFLEF, and at the same time the difference DVLAF in the oxygen concentration VLAF cannot become equal to or higher than the predetermined value DVLAFLEF. Thus, it is determined that the valve-actuating system has failed. After execution of the failure-determining operation mode as described above, the cylinders #1 to #3 are normally operated (if the valve-actuating system is normal). Accordingly, the oxygen concentration VLAF is changed such that it becomes smaller.

As described hereinabove, according to the failure determination system 1 of the present embodiment, in the failure-determining operation mode, the intake valves and exhaust valve of the cylinders #1 to #3 are opened and closed in a state in which fuel supply to the cylinders #1 to #3 is stopped or interrupted. In this case, if the valve-actuating system for the cylinders #1 to #3 is normally operating, a state is forcibly produced in which the oxygen concentration VLAF is made by far higher than before execution of the failure-determining operation mode. This oxygen concentration VLAF is compared with the predetermined value VLAFLEF, and the difference DVLAF in the oxygen concentration VLAF is compared with the predetermined value DVLAFLEF, whereby it is determined whether or not the valve-actuating system has failed. As a result, the failure determination can be carried out more promptly and accurately than the conventional system. Particularly, the difference DVLAF in the oxygen concentration VLAF is compared with the predetermined value DVLAFLEF, and hence even if the concentration of oxygen in exhaust gases tends to be drifted to a relatively high value before execution of the failure-determining operation mode, e.g. under conditions in which the concentration of oxygen in exhaust gases tends to be high, it is possible to prevent erroneous failure determination caused by the drift, which further enhances the accuracy of failure determination.

Although in the present embodiment, the failure determination of the valve-actuating system is executed based on the oxygen concentration VLAF and the difference or amount of change DVLAF in the oxygen concentration VLAF, this is not limitative, but the failure determination may be carried out based on one of the oxygen concentration VLAF and the difference DVLAF. Further, although in the present embodiment, during the failure-determining operation mode, the intake valves and exhaust valves of all the three cylinders #1 to #3 are opened and closed in a state in which fuel injection into the cylinders is not carried out, in the case of an internal combustion engine having a plurality of valve-actuating systems associated with the respective cylinders for driving the valves thereof, the intake valve and exhaust valve of one of the three cylinders may be opened and closed when the partial cylinder operation mode is switched to the all-cylinder operation mode, and then similarly, those of the other cylinders may be sequentially opened and closed each time the partial-cylinder operation mode is switched to the all-cylinder operation mode. This makes it possible to determine which of the valve-actuating systems associated with the respective cylinders has failed. Further, although in the FIG. 3 example, the intake valves and the exhaust valves are opened and closed during one combustion cycle per cylinder in a state in which fuel injection is stopped, it goes without saying that the intake and exhaust valves may be opened and closed during two or more combustion cycles per cylinder.

Further, as a sensor for detecting the concentration of oxygen in exhaust gases, an oxygen concentration sensor of a type whose output sharply changes at a predetermined air-fuel ratio may be employed in place of the LAF sensor according to the present embodiment.

It is further understood by those skilled in the art that the foregoing is a preferred embodiment of the invention, and that various changes and modifications may be made without departing from the spirit and scope thereof.

What is claimed is:

1. A failure determination system for a variable-cylinder internal combustion engine including a plurality of cylinders each having at least one intake valve and at least one exhaust valve, and a valve-actuating system including a valve-actuating mechanism for actuating said at least one intake valve and said at least one exhaust valve of each of said cylinders, said engine being capable of switching a cylinder operation mode between an all-cylinder operation mode in which all of said plurality of cylinders are operated, and a partial-cylinder operation mode in which fuel supply to part of said plurality of cylinders is stopped and at the same time said part of said plurality of cylinders are made idle by stopping said valve-actuating mechanism from actuating said at least one intake valve and said at least one exhaust valve of each of said part of said cylinders, the failure determination system comprising:

oxygen concentration-detecting means for detecting a concentration of oxygen in exhaust gases exhausted from said plurality of cylinders;

failure-determining operation mode-executing means for executing a failure-determining operation mode for causing said valve-actuating mechanism to resume actuation of said at least one intake valve and said at least one exhaust valve of at least one of said part of said cylinders in a state in which said fuel supply to said part of said cylinders is stopped, when said cylinder operation mode is switched from said partial-cylinder operation mode to said all-cylinder operation mode; and failure determination means for determining whether or not said valve-actuating system including said valve-actuating mechanism has failed, based on an oxygen concentration detected by said oxygen concentration-detecting means when said failure-determining operation mode is executed.

2. A failure determination system according to claim 1, wherein said failure determination means determines that said valve-actuating system has failed, when said oxygen concentration is equal to or lower than a predetermined value.

3. A failure determination system according to claim 1, wherein said failure determination means determines that said valve-actuating system has failed, when an amount of change in said oxygen concentration in an increasing direction is smaller than a predetermined amount of change.

4. A failure determination system for a variable-cylinder internal combustion engine including a plurality of cylinders each having at least one intake valve and at least one exhaust valve, and a valve-actuating system including a valve-actuating mechanism for actuating said at least one intake valve and said at least one exhaust valve of each of said cylinders, said engine being capable of switching a cylinder operation mode between an all-cylinder operation mode in which all of said plurality of cylinders are operated, and a partial-cylinder operation mode in which fuel supply to part of said plurality of cylinders is stopped and at the same time said part of said plurality of cylinders are made idle by stopping said valve-actuating mechanism from actuating said at least one intake valve and said at least one exhaust valve of each of said part of said cylinders, the failure determination system comprising:

an oxygen concentration-detecting module for detecting a concentration of oxygen in exhaust gases exhausted from said plurality of cylinders;

a failure-determining operation mode-executing module for executing a failure-determining operation mode for causing said valve-actuating mechanism to resume actuation of said at least one intake valve and said at least one exhaust valve of at least one of said part of said cylinders in a state in which said fuel supply to said part of said cylinders is stopped, when said cylinder operation mode is switched from said partial-cylinder operation mode to said all-cylinder operation mode; and a failure determination module for determining whether or not said valve-actuating system including said valve-actuating mechanism has failed, based on an oxygen concentration detected by said oxygen concentration-detecting module when said failure-determining operation mode is executed.

5. A failure determination system according to claim 4, wherein said failure determination module determines that said valve-actuating system has failed, when said oxygen concentration is equal to or lower than a predetermined value.

6. A failure determination system according to claim 4, wherein said failure determination module determines that said valve-actuating system has failed, when an amount of change in said oxygen concentration in an increasing direction is smaller than a predetermined amount of change.

7. A method of determining failure of a valve-actuating system of a variable-cylinder internal combustion engine including a plurality of cylinders each having at least one intake valve and at least one exhaust valve, and said valve-actuating system including a valve-actuating mechanism for actuating said at least one intake valve and said at least one exhaust valve of each of said cylinders, said engine being capable of switching a cylinder operation mode between an all-cylinder operation mode in which all of said plurality of cylinders are operated, and a partial-cylinder operation mode in which fuel supply to part of said plurality of cylinders is stopped and at the same time said part of said plurality of cylinders are made idle by stopping said valve-actuating mechanism from actuating said at least one intake valve and said at least one exhaust valve of each of said part of said cylinders, the failure determination method comprising the steps of:

detecting a concentration of oxygen in exhaust gases exhausted from said plurality of cylinders;

executing a failure-determining operation mode for causing said valve-actuating mechanism to resume actuation of said at least one intake valve and said at least one exhaust valve of at least one of said part of said cylinders in a state in which said fuel supply to said part of said cylinders is stopped, when said cylinder operation mode is switched from said partial-cylinder operation mode to said all-cylinder operation mode; and determining whether or not said valve-actuating system including said valve-actuating mechanism has failed, based on an oxygen concentration detected when said failure-determining operation mode is executed.

8. A method according to claim 7, wherein the determining step includes determining that said valve-actuating system has failed, when said oxygen concentration is equal to or lower than a predetermined value.

9. A method according to claim 7, wherein the determining step includes determining that said valve-actuating system has failed, when an amount of change in said oxygen concentration in an increasing direction is smaller than a predetermined amount of change.

10. An engine control unit including a control program for causing a computer to carry out determination of failure of a valve-actuating system of a variable-cylinder internal combustion engine including a plurality of cylinders each having at least one intake valve and at least one exhaust valve, and said valve-actuating system including a valve-actuating mechanism for actuating said at least one intake valve and said at least one exhaust valve of each of said cylinders, said engine being capable of switching a cylinder operation mode between an all-cylinder operation mode in which all of said plurality of cylinders are operated, and a partial-cylinder operation mode in which fuel supply to part of said plurality of cylinders is stopped and at the same time said part of said plurality of cylinders are made idle by stopping said valve-actuating mechanism from actuating said at least one intake valve and said at least one exhaust valve of each of said part of said cylinders, wherein the control program causes the computer to detect a concentration of oxygen in exhaust gases exhausted from said plurality of cylinders, execute a failure-determining operation mode for causing said valve-actuating mechanism to resume actuation of said at least one intake valve and said at least one exhaust valve of at least one of said part of said cylinders in a state in which said fuel supply to said part of said cylinders is stopped, when said cylinder operation mode is switched from said partial-cylinder operation mode to said all-cylinder operation mode, and determine whether or not said valve-actuating system including said valve-actuating mechanism has failed, based on an oxygen concentration detected when said failure-determining operation mode is executed.

11. An engine control unit according to claim 10, wherein said control program causes said computer to determine that said valve-actuating system has failed, when said oxygen concentration is equal to or lower than a predetermined value.

12. An engine control unit according to claim 10, wherein said control program causes said computer to determine that said valve-actuating system has failed, when an amount of change in said oxygen concentration in an increasing direction is smaller than a predetermined amount of change.

* * * * *